United States Patent [19]

Frode

[11] Patent Number: 4,693,535
[45] Date of Patent: Sep. 15, 1987

[54] TERMINAL CONNECTOR FOR AN ELECTROCHEMICAL ACCUMULATOR BATTERY

[75] Inventor: Per E. Frode, Mockebo, Sweden
[73] Assignee: SAB Nife AB, Landskrona, Sweden
[21] Appl. No.: 785,791
[22] Filed: Oct. 9, 1985
[30] Foreign Application Priority Data Oct. 29, 1984 [SE] Sweden ............................ 8405403

[51] Int. Cl.⁴ ............................................. H01R 4/00
[52] U.S. Cl. ................................. 439/277; 429/160; 439/737
[58] Field of Search ......... 339/126 RS, 214 R, 214 C, 339/214 S, 60 C, 60 R, 94 A, 94 R, 94 C, 94 L, 94 M; 429/158, 159, 160, 161

[56] References Cited

U.S. PATENT DOCUMENTS

| | | | |
|---|---|---|---|
| 2,558,851 | 7/1951 | Jacobi | 339/214 R |
| 3,607,434 | 9/1971 | Bournville et al. | 429/160 |
| 3,766,442 | 10/1973 | Pearce | 339/214 C |
| 3,767,889 | 10/1973 | Sano et al. | 429/158 |
| 3,986,765 | 10/1976 | Shaffer et al. | 339/126 RS |
| 4,053,693 | 10/1977 | Munch et al. | 339/126 RS |
| 4,076,368 | 2/1978 | Erickson | 339/214 R |
| 4,231,631 | 11/1980 | Guerinault et al. | 339/94 A |
| 4,480,018 | 10/1984 | de Bellis et al. | 429/160 |

FOREIGN PATENT DOCUMENTS 0003113 4/1981 European Pat. Off. .

Primary Examiner—Gil Weidenfeld
Assistant Examiner—Gary F. Paumen
Attorney, Agent, or Firm—Laurence Brown & Associates

[57] ABSTRACT

Means for providing an electrical connection between adjacent cells in an electrochemical accumulator battery through an opening in a cell wall made of plastic material. In a joint (10) consisting of a screw (32) passed through concentric openings (16, 28, 30) in the leg (24, 26) of each plate group bus (20, 22) and in the cell wall (18) and a nut (34) holding the joint together, each leg (24, 26) is arranged tightly against the cell wall (18). Around the screw (32) there is arranged in the openings (16) in the cell wall an annular spacer (36) of greater external diameter than the openings in the legs and with a thickness smaller than that of the cell walls and made of a harder material than the cell walls.

6 Claims, 4 Drawing Figures

TERMINAL CONNECTOR FOR AN ELECTROCHEMICAL ACCUMULATOR BATTERY

TECHNICAL FIELD

The present invention relates to the connection of terminals of electrochemical accumulator batteries having casings made of plastic material, wherein adjacent cells are separated by a common cell wall and the connection between the terminals is arranged inside the battery container through the wall.

The invention relates in particular to a means in such a battery for sealed lead-through of a screw-joint to provide an electrical connection between two adjacent cells through an opening in a cell wall made of plastic material, wherein a leg, parallel with the wall, of a plate group bus connecting electrode plates exhibits an opening for the screw-joint and is arranged at either side of the wall and wherein the screw-joint consists of a screw passed through the three concentric openings and a nut holding the joint together.

DESCRIPTION OF THE PRIOR ART

Prismatic accumulator batteries, for example those of the Ni/Cd-type, are manufactured both in the form of single cells which, depending on their intended application, may be connected to give the desired battery configuration, and in the form of integrated battery units. It is thus possible to identify two embodiments, on the one hand designs based on the battery casing having dimensions to suit the application and provided with the appropriate number of individual cells, known as the 'monoblock' configuration, and on the other hand battery units built up from a number of cell modules and joined together by the use of a common wall between adjacent cells, known as the 'block' configuration.

The electrical connection between the terminals of the cells can be achieved through the use of externally applied contact means, often positioned on top of the cells. In the case of block and monoblock batteries, this connection can often be arranged internally through the cell walls. The advantages associated with this approach are mainly that the height of the battery, as well as the material costs and the weight, can be reduced. The disadvantages are principally the impaired dissipation of heat from the battery and reduced accessibility when looking for faults. The requirements of the particular applications will determine what configuration should be selected.

Various technical solutions are available to the problem of connecting the terminals in batteries of the monoblock configuration. The mounting of such batteries involves fitting the electrode assembly into vertical compartments open towards the top inside the battery casing, in which case terminals are easily accessible for connection. This is not true for the internal connection of terminals in batteries of the block configuration. The cell containers used in this case are usually in the form of shallow troughs, open in one plane, which is arranged parallel with the surface of the electrode plates during assembly of the battery. When casings are to be connected to casings, the wall plane facing the opening serves as the intercell partition wall between adjacent cells. The connection of the terminals through these walls must, therefore, take place as an operation in the assembly of the battery, involving the mounting of a first electrode assembly in a first compartment, the attachment of a second compartment to the opening in the first compartment, the mounting of a second electrode assembly in the second compartment, wand connecting the terminals of the first and the second assemblies, and so on.

It will be appreciated from the foregoing that different requirements are imposed on the connection means depending on the type of assembly. In the efficient production of batteries every effort is made, however, to arrive at connection means which are so constructed that the same plate group bus and terminal connectors can be used in the different types of assembly.

A means of this kind is disclosed in EP-B-0 003 133. This relates to a sealed lead-through of a screw-joint intended to provide electrical connection between adjacent cells through an opening in one cell wall made of plastic material. A leg of a plate group bus for connecting electrode plates together is arranged at either side of the wall. The screw-joint, which is mounted through the concentric openings in the legs and the cell wall, comprises a connecting element connected to the leg of one of the plate group buses via a threaded section with a nut and to the other leg via a threaded blind hole with a screw. Tightening of the screw-joint causes an annular spacer around the connecting element to expand, providing reliable sealing and contact. This complicated arrangement suffers from the disadvantage of being costly with regard both to the components required and to the assembly operations involved.

THE INVENTION

These disadvantages are eliminated by the present invention, which makes use of a connection consisting of a screw passed through concentric openings in the leg on each plate group bus and in the cell wall and a nut holding the connection together, said invention being characterized in that an annular spacer with greater external diameter than the openings in the legs and with a thickness smaller than that of the cell wall and made of a harder material than the cell wall is arranged around the screw in the opening in the cell wall, and in that each leg of the plate group bus is arranged tightly against the cell wall and is forced by the screw-joint against the spacer, the interjacent part of the cell wall acting as a sealing gasket in the means.

This means utilizes the wall of the container and the legs of the plate group buses as sealing elements interacting with a simple screw-joint, and as such requires a minimum of components, yet still provides reliable electrical connection and the necessary sealing between the cells.

One embodiment, which is particularly appropriate where one of the plate group buses is obstructed during final assembly, is characterized in that the screw is retained in the leg opening closest to its head by press fit. In a preferred embodiment the screw has straight knurling as its head over a distance corresponding to the thickness of the leg, the transition between the knurling and the head having a smooth and rounded surfce in order to provide a sealed connection with the edge of the hole in the leg.

This means that the screw can be fixed into a plate group bus in such a way that the joint can be tightened up even if the screw head is not accessible to holding tools.

Preferably the opening in the cell wall is surrounded on both sides by at least one sealing ring constituting an integral part of and projecting from the wall material and preferably having triangular cross-section so as to interact in a sealing fashion with each of the legs. The spacer should preferably be electrically conductive and have circular cross-section.

BRIEF DESCRIPTION OF THE DRAWING

The invention is now described in greater detail with reference to the accompanying drawing, in which FIG. 1 in the form of a section through part of an accumulator battery shows an example of an embodiment in accordance with the invention.

DESCRIPTION OF A PREFERRED EMBODIMENT

Figure 1:
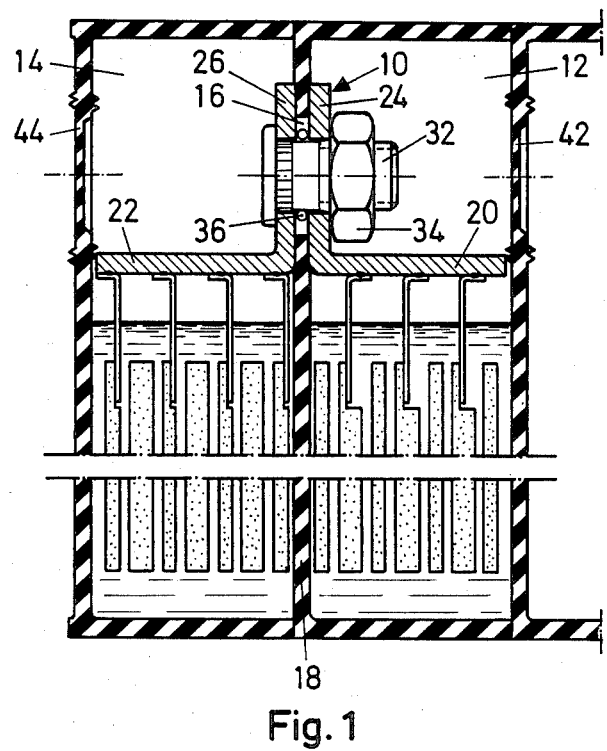
Figure 2:
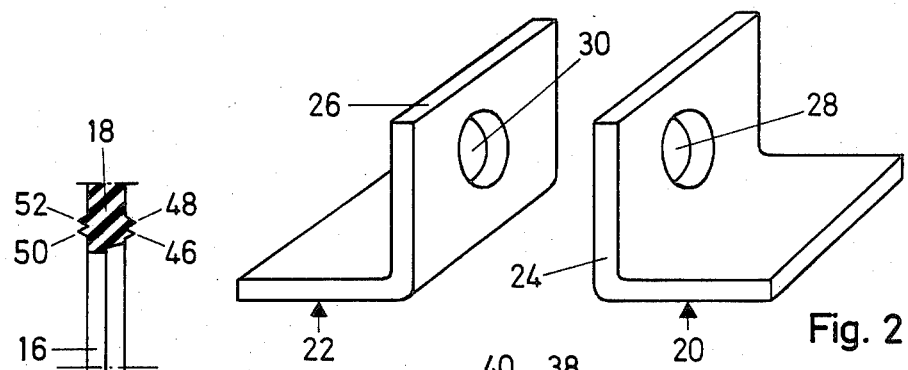
FIG. 2 shows an example of the construction of the plate group buses.
Figure 3:
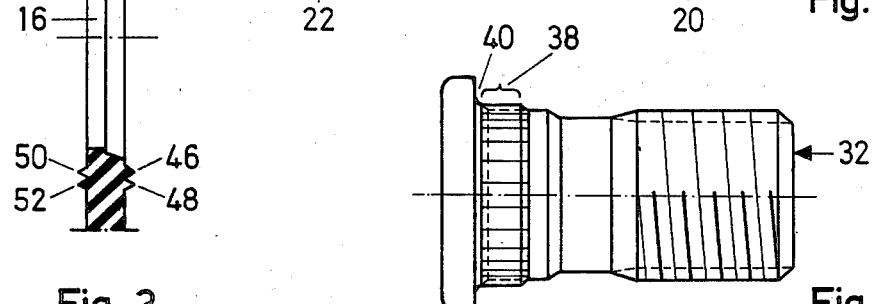
FIG. 3 is a central section on an enlarged scale through the opening in an intercell partition wall, and FIG. 4 on an enlarged scale shows an example of a preferred screw.
Figure 4:
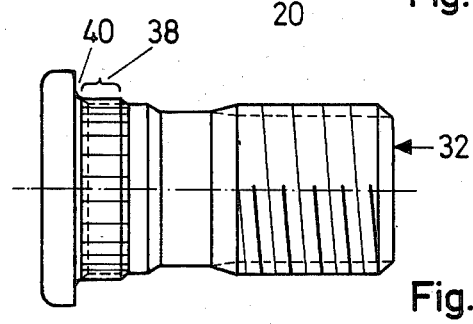

The reference designation 10 is used in the Figures to denote a means in accordance with the invention for the sealed lead-through of a screw-joint intended to provide an electrical connection between two adjacent cells 12, 14 through an opening 16 in a common cell wall 18 made of plastic material in an electrochemical accumulator battery, where each accumulator cell consists of a number of essentially flat, vertically arranged positive and negative plates.

In each cell the positive plates are connected to form an electrode group by means of a plate group bus 20, and the negative plates are similarly connected to form an electrode group by means of a plate group bus 22. These buses are arranged at either side of the wall and consist of L-shaped metal plates bent to a right angle with legs 24, 26 provided with circular openings 28, 30 for the screw-joint.

The screw-joint consists of a screw 32 passed through the three concentric openings 16, 28, 30, and a nut 34 holding the joint together.

The leg 24, 26 of each of the plate group buses 20, 22 is arranged tightly to the cell wall 18. An annular spacer 36 of greater external diameter than the openings 28, 30 in the legs 24, 26 and with a thickness smaller than that of the cell wall and made of a harder material than the cell wall is arranged around the screw 32 in the opening 16 in the cell wall.

The openings 28, 30 in the legs are best produced by stamping directed from the inside of the bend of the buses. The openings 28, 30 thus provide a burr-free connection with the head of the screw 32.

The screw 32, which is best forged and roller-threaded, is attached in a preferred embodiment by press fit in the opening 30 in the leg closest to its head. This press fit is best achieved in that the screw has straight knurling at its head over a distance 38 corresponding to the thickness of the leg 26. The transition 40 between the knurling and the head should have a smooth and rounded surface in order to provide a sealed connection with the edge of the hole in the leg.

The cell containers are best produced by injection moulding, preferably from a thermoplastic such as polypropylene, so as to permit a certain amount of plastic deformation to take place without crack formation. The containers may also be prepared for perforation to permit the screw-joints to be passed through by the provision of appropriately positioned indentations in the form of thinner areas 42, 44 of material. In a preferred embodiment the opening 16 in the cell wall 18 is surrounded on both sides by at least one sealing ring 46, 48, 50, 52 constituting an integral part of and projecting from the wall material and preferably having triangular cross-section so as to interact in a sealing fashion with each of the legs 24, 26.

In a preferred embodiment the spacer 36, which is arranged around the screw 32 in the opening 18 in the cell wall, is electrically conductive and has circular cross-section. The spacer itself has no sealing function, for which reason it is not subject to any requirement to the effect that it must be an unbroken ring. It may accordingly be produced from metal wire, preferably iron wire, which offers advantageously low cost together with high dimensional accuracy.

Tightening of the screw-joint will cause the legs 24, 26 to be pressed together against the spacer 36, whereby the connection is imparted with a stable position providing reliable electrical connection between the plate group buses. At the same time the interjacent part of the cell wall 18 will be plastically deformed to a certain degree and will serve as a sealing gasket inside the means.

The fixing of the joint, and thus the electrical connection, is favoured by the high specific surface pressure between the legs and the spacer, which is most easily achieved using spacers of circular cross-section.

The sealing afforded by the means between adjacent cells is good. It is not total, however, which is not necessary, and consequently no attempt has been made to achieve total sealing. The electrical leakage current which can arise as a result of lack of sealing between the cells is, in fact, proportional to the cross-sectional area of the leak. The leak in the terminal connector of this invention is so small that the level of the leakage current is negligible.

INDUSTRIAL APPLICABILITY

The means in accordance with the present invention represents a major step forward towards the rational and automated production of electrochemical accumulator batteries by having minimized the number of components and assembly operations, at the same time as the maximum use is made of structural elements which are common to a large group of electrochemical power sources.

I claim:

1. A connection in an electrochemical accumulator battery for sealed lead-through of a screw-joint providing an electrical connection between two adjacent cells through an opening in a cell wall said connection comprising: a cell wall made of plastic material and having an opening, a pair of plate group busses each connecting a plurality of electrode plates, each plate group bus having a leg parallel with the cell wall and positioned on opposite sides of the wall, and each said leg having an opening aligned with the wall opening, and a screw having a threaded body portion and a head portion and extending through the openings in the wall and in the plate group busses to define a screw-joint, a nut engageable with the threaded body of the screw for holding the joint together, an annular spacer having an external diameter greater than those of the openings in the plate group bus legs and smaller than the diameter of the cell wall opening and having a thickness smaller than the thickness of the cell wall and made of a harder material than the cell wall material, said spacer carried around the body portion of the screw and positioned in the opening in the cell wall, wherein each leg of the plate group bus is arranged tightly against a side of the cell wall and is forced by the screw-joint against the spacer, an interjacent part of the cell wall between the plate group bus legs being deformable and acting as a sealing gasket between the two legs.

2. A connection as claimed in claim 1, wherein the screw includes retaining means cooperable with an opening in a leg and is retained in the leg opening closest to its head by a press fit between the retaining means and the leg opening.

3. A connection as claimed in claim 2, wherein the retaining means in the screw includes straight knurling in the screw body at its head over a distance corresponding to the thickness of the adjacent leg, and a transition surface between the knurling and the head, the transition surface having a smooth and rounded surface in order to provide a sealed connection with an edge of the hole in the adjacent leg.

4. A connection as claimed in claim 1, wherein the opening in the cell wall is surrounded on both sides by at least one sealing ring constituting an integral part of and projecting from the cell wall material, said at least one sealing ring having a triangular cross-section so as to contact and interact in a sealing fashion with an adjacent one of the legs.

5. A connection as claimed in claim 1, wherein the spacer is electrically conductive.

6. A connection as claimed in claim 1, wherein the spacer has a circular cross-section.

* * * * *